(12) United States Patent
Held et al.

(10) Patent No.: US 7,843,153 B2
(45) Date of Patent: Nov. 30, 2010

(54) CONTROL SYSTEM FOR CONTROLLING AN ADJUSTING DEVICE OPERATED BY ELECTRIC MOTOR IN A MOTOR VEHICLE

(75) Inventors: Jochen Held, Forchheim (DE); Roland Kalb, Grossheirath (DE); Markus Schlesiger, Hallstadt (DE); Rene Zellmer, Sonnefeld (DE); Jürgen Buhlheller, Knetzgau (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 90 days.

(21) Appl. No.: 12/097,236

(22) PCT Filed: Nov. 28, 2006

(86) PCT No.: PCT/EP2006/011520

§ 371 (c)(1),
(2), (4) Date: Oct. 6, 2008

(87) PCT Pub. No.: WO2007/068362

PCT Pub. Date: Jun. 21, 2007

(65) Prior Publication Data

US 2009/0090061 A1    Apr. 9, 2009

(30) Foreign Application Priority Data

Dec. 12, 2005    (DE) .................. 20 2005 019 565 U

(51) Int. Cl.
*H02P 7/00* (2006.01)

(52) U.S. Cl. .................. 318/264; 318/466; 318/467; 318/468; 318/469; 318/432; 318/437; 318/255; 318/256; 318/434; 323/274; 323/284; 701/36; 701/49

(58) Field of Classification Search ............... 318/286, 318/280, 256, 264, 269, 273, 282, 461, 466; 180/286, 289, 330, 326, 334, 328, 327, 173; 49/28, 26; 323/274, 284; 701/36, 49
See application file for complete search history.

(56) References Cited

U.S. PATENT DOCUMENTS 4,641,067 A * 2/1987 Iizawa et al. ................ 318/287

(Continued)

FOREIGN PATENT DOCUMENTS

DE    32 06 243 A1    9/1983

(Continued)

OTHER PUBLICATIONS

International Preliminary Report on Patentability for International Application No. PCT/EP2006/011520, dated Jul. 17, 2008, 7 pages.

(Continued)

*Primary Examiner*—Rita Leykin
(74) *Attorney, Agent, or Firm*—Christie, Parker & Hale, LLP

(57) ABSTRACT

A control system for controlling an adjustment device which is operated by electric motor in a motor vehicle includes an indirect anti-trapping system for detecting a trapping situation between an adjustment element, which is moved by the adjustment device in an adjustment movement along an adjustment path, and a vehicle element. The anti-trapping system stops or reverses the adjustment movement of the adjustment element if a defined threshold value for a mechanical running parameter—which results from the adjustment movement is exceeded. The anti-trapping system operates with an analysis unit for analyzing the adjustment movement of the adjustment element, wherein the control system is configured and embodied in such a way that by means of the analysis unit, in an analysis mode, the running parameters of the adjustment device can be checked for mechanical functional faults of the adjustment device.

21 Claims, 2 Drawing Sheets

U.S. PATENT DOCUMENTS

| | | | |
|---|---|---|---|
| 5,578,912 A * | 11/1996 | Mizuta et al. | 318/434 |
| 5,789,887 A | 8/1998 | Elischewski | |
| 5,982,124 A * | 11/1999 | Wang | 318/466 |
| 6,064,165 A * | 5/2000 | Boisvert et al. | 318/465 |
| 6,366,040 B1 * | 4/2002 | McLennan et al. | 318/280 |
| 6,437,528 B1 * | 8/2002 | Wagner et al. | 318/282 |
| 6,597,139 B1 * | 7/2003 | Klesing | 318/445 |
| 6,630,808 B1 * | 10/2003 | Kliffken et al. | 318/466 |
| 6,657,409 B1 * | 12/2003 | Leivenzon et al. | 318/476 |
| 6,686,669 B1 * | 2/2004 | Knab et al. | 307/9.1 |
| 6,739,212 B2 * | 5/2004 | Flynn | 74/512 |
| 6,806,664 B2 * | 10/2004 | Beishline | 318/280 |
| 6,823,629 B2 * | 11/2004 | Mersch | 49/506 |
| 7,070,226 B2 * | 7/2006 | Cleland et al. | 296/146.8 |
| 7,219,575 B2 * | 5/2007 | Flynn | 74/512 |
| 2003/0213177 A1 | 11/2003 | Fitzgibbon et al. | |
| 2006/0208169 A1 * | 9/2006 | Breed et al. | 250/221 |

FOREIGN PATENT DOCUMENTS

| | | |
|---|---|---|
| DE | 196 33 941 A1 | 2/1998 |
| DE | 197 45 597 A1 | 4/1999 |
| DE | 197 48 934 A1 | 5/1999 |
| DE | 197 50 189 A1 | 6/1999 |
| DE | 198 09 628 A1 | 9/1999 |
| GB | 2 010 957 A | 7/1979 |

OTHER PUBLICATIONS

Japanese Patent Abstracts, Publication No. 09078941 A, Published on Mar. 25, 1997, in the name of Keiichi et al.

Japanese Patent Abstracts, Publication No. 08086145 A, Published on Apr. 2, 1996, in the name of Kenichi et al.

* cited by examiner

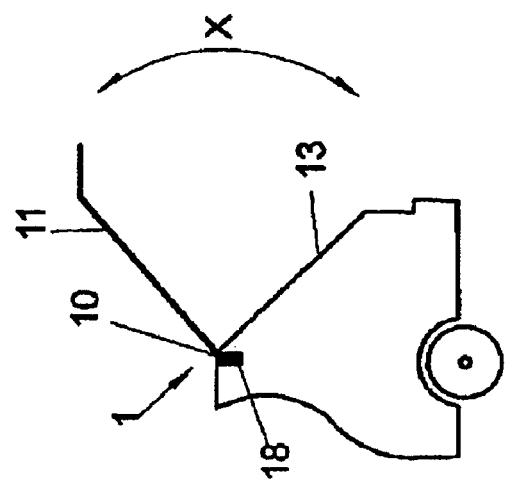
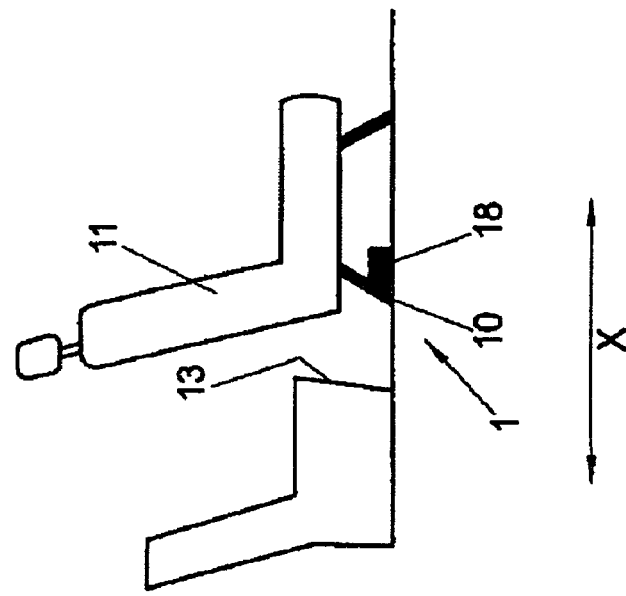
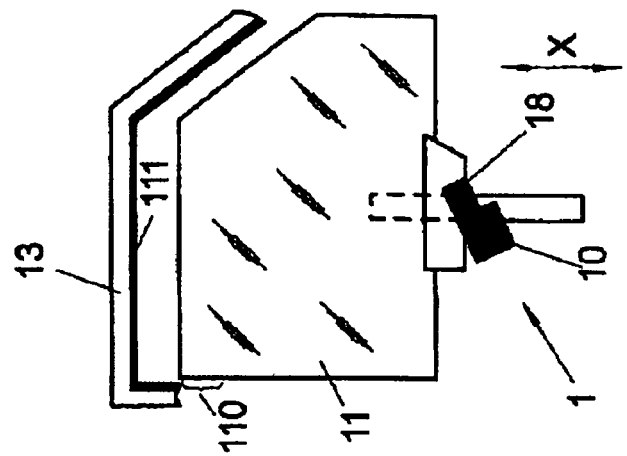

CONTROL SYSTEM FOR CONTROLLING AN ADJUSTING DEVICE OPERATED BY ELECTRIC MOTOR IN A MOTOR VEHICLE

CROSS-REFERENCE TO A RELATED APPLICATION

This application is a National Phase Patent Application of International Patent Application Number PCT/EP2006/011520, filed on Nov. 28, 2006, which claims priority of German Utility Model Application Number 20 2005 019 565.0, filed on Dec. 12, 2005.

BACKGROUND

The invention relates to a control system for controlling an adjustment device which is operated by electric motor in a motor vehicle.

Such control systems often comprise an indirect anti-trapping system for detecting a trapping situation between an adjustment element which is moved by the adjustment device in an adjustment movement along an adjustment path, and a vehicle element. Such adjustment elements are embodied, in particular, as a window pane, as a motor vehicle seat or as a motor vehicle door or as a tailgate.

The indirect anti-trapping system comprises an analysis unit with which the adjustment unit of the adjustment element can be analyzed. By means of this analysis of the adjustment movement, the analysis unit can determine whether an obstacle which is trapped between the moved adjustment element and the vehicle element is located in the traveling path of the adjustment element. The vehicle element may be any desired component of the motor vehicle toward which the vehicle element moves during the adjustment movement so that the distance between the vehicle element and the adjustment element becomes smaller.

The analysis of the adjustment movement is usually carried out in this context by means of characteristic parameters of the assigned drive unit which serves as a drive for the adjustment unit of the adjustment element. If said parameters differ from a predefined pattern or if they exceed defined threshold values, the anti-trapping system stops and reverses the adjustment movement of the adjustment element. In contrast to direct anti-trapping systems in which a sensor unit detects the mechanical trapping process of an obstacle, the indirect anti-trapping system detects the trapping process by means of the evaluation of the characteristic parameters of the drive unit.

Such indirect control systems are usually tested after the assembly of the assigned adjustment device in the motor vehicle by virtue of the fact that an obstacle is placed in the traveling path of the adjustment element in order to simulate the case of trapping. If the indirect anti-trapping means is triggered, the control system and the adjustment device are classified free of faults.

However, the known control systems have the disadvantage that only adjustment devices which are mounted without faults in this way and which move with such difficulty that their difficulty of movement causes the indirect anti-trapping system to respond are detected as unsuitable. However, certain mounting faults often also cause faulty mechanical running properties which are not detected by the anti-trapping system. These faulty running properties may occur, for example, as difficulties in movement which are below the response threshold for the anti-trapping system. It is also conceivable for incorrect mounting of the adjustment device to lead to undesired easy movements of the adjustment device.

These mounting faults, together with gradually occurring wear phenomena of the adjustment device, can lead, in particular, to a situation in which the difficulty of movement of the adjustment device increases to such an extent that as a result the anti-trapping system is triggered. This undesired effect often occurs only after a certain period of use of the adjustment device by the end user.

SUMMARY

The present invention is therefore based on the object of making available a control system for motor vehicle adjustment devices with an indirect anti-trapping system which has improved detection of mounting faults of the adjustment device.

The invention provides that, in an analysis mode, the control system is configured and embodied in such a way that mechanical running parameters of the adjustment device which result from the adjustment movement can be checked for mechanical functional faults of the adjustment device by means of the analysis unit in that threshold values for the running parameters which are above or below the threshold values for the detection of a trapping situation are selected in the analysis mode.

A double function of the analysis unit of the anti-trapping system is therefore provided. As already described, this analysis unit functions, on the one hand, as a functional component of the indirect anti-trapping system. On the other hand, the analysis unit analyzes the parameters of the drive unit in respect of the mechanical running parameters of the adjustment device. All the physically measurable variables which interact within the mechanical movement sequence of the adjustment device are to be considered mechanical running parameters. Said variables are, in particular, the rotational speed profile and the torque profile of the drive unit, the length of the movement of the adjustment element along the adjustment path and the idle travel of the distance device when the direction of movement of the adjustment element reverses.

The control system is exemplary embodied in such a way that the functional faults can be determined in the form of above-average difficulty of movement of the adjustment device in certain sections along the adjustment path. However, additionally or alternatively, the analysis of the existing parameters can also be used to determine above-average ease of movement of the adjustment device during the movement of the adjustment element. Above-average ease of movement of the adjustment device can also be caused by mounting faults.

It is expedient if the control system comprises a control unit. This control unit is embodied and configured in such a way that the analysis result can be represented by means of at least one diagnostic message which is generated by the control unit. It goes without saying that for this purpose the control unit can also be embodied as an integral component of the analysis device. Within the scope of the integrated electronic components which are usually employed such integration is easily made possible. It is decisive whether or not the functionality of the generation of an analysis message is implemented by the control system.

These diagnostic messages are usually generated by the control system automatically or in response to a manual request. For the manual request, an activation element is provided at a suitable location on the adjustment device.

The control system exemplary ensures that the diagnostic message is implemented with a characteristic movement sequence of the adjustment element and/or as a visual diagnostic message in the form of a display of a message on a display which is arranged on the motor vehicle. For this purpose, during the mounting process it is possible to use, for example, the display of an on-board computer or of a navigation system which is provided in any case in many motor vehicles.

The information represented on the display is expediently in the form of a diagram which represents the traveling movement of the adjustment element. In this diagram, the torque profile is plotted against time, for example over the entire movement sequence of the adjustment element. It goes without saying that other information can also be represented in the diagram. The mechanical running properties which are mentioned above can be represented in a suitable way in this context. All the representations of information which permits the quality of the mounting to be determined by the adjustment device are suitable.

A visual diagnostic message in the form of such a diagram exemplary has a text component which is also represented on the display. Such a text message preferably contains information about whether mechanical functional faults of the adjustment device are present. If such mechanical functional faults of the adjustment device have been determined, it is expedient if the text component of the visual diagnostic message has more extensive information on fault recovery. This information can also refer to external information sources on fault recovery, such as for example to a manual.

The control system exemplary carries out rotational speed monitoring of the adjustment device by means of the analysis unit forming mean values over the entire adjustment path. This monitoring of the rotational speed can also be divided up among a plurality of movement sections of the adjustment device along the adjustment path by forming mean values in sections.

Additionally or alternatively it is expedient if the control system monitors the fluctuations in synchronism of the adjustment device by means of the analysis unit. The monitoring of the fluctuations in synchronism can also be divided into a plurality of sections.

With regard to the double function of the analysis device which is mentioned at the beginning, it is expedient the control system has an analysis mode which can be activated by means of an activation element on the motor vehicle. The activation element is preferably embodied in this context in such a way that the analysis mode is not activated until a code has been input.

The analysis mode is distinguished in one application in that, in the analysis mode of the control system, the analysis unit of the anti-trapping system has lower threshold values for a maximum torque and/or a maximum change in torque of the adjustment device over a time interval or over a distance interval of the adjustment path. In this way it is possible to determine critical position areas of difficulties of mechanical movement along the adjustment path of the adjustment element.

A further exemplary variant comprises embodying and configuring the control system in such a way that, for critical position areas along the adjustment path at which the lower threshold values are exceeded, the diagnostic message is embodied as a characteristic movement sequence of the adjustment element along the critical position areas. In addition it is possible to provide for the diagnostic message to be embodied as a visual information for critical position areas, and to cause it to be displayed by means of a display which is arranged on the motor vehicle.

The preceding statements apply to the representation on the display.

A further exemplary variant of the control system consists in embodying the control system with an electronic memory element for storing the mechanical running parameters which are determined. It is also conceivable that additionally or alternatively there is a storage medium in which corresponding running parameters are stored for a satisfactorily mounted adjustment device. Said running parameters can then be compared with the determined mechanical running parameters by means of the analysis device.

An adjustment device in the form of a window lifting system for a motor vehicle window pane is exemplary embodied with one of the control systems described above.

It is expedient here to compare the mechanical running parameters which are determined for the running-in area of the window pane into an assigned window seal with parameter limiting values for satisfactory running into the seal of the window pane. In this way it is possible to test the satisfactory mounting of the adjustment device, embodied as a window lifting system, with regard to the often critical running in of the window pane into the window seal.

Likewise, an exemplary embodiment variant of the control system which is described above can be provided for an adjustment device in the form of a motor vehicle seat which can be adjusted by electric motor or an electrically adjustable tailgate of a motor vehicle.

BRIEF DESCRIPTION OF THE DRAWINGS

Further features and advantages of the inventions are explained in conjunction with the preferred exemplary embodiments which are described in the text which follows.

In the figures:

FIG. 2a shows a first application variant of the control system in a window lifting system of a motor vehicle.

FIG. 2b shows a second application variant of the control system for an adjustment device of a motor vehicle seat.

FIG. 2c shows a third application variant of the control system for the adjustment device.

DETAILED DESCRIPTION

Figure 1:
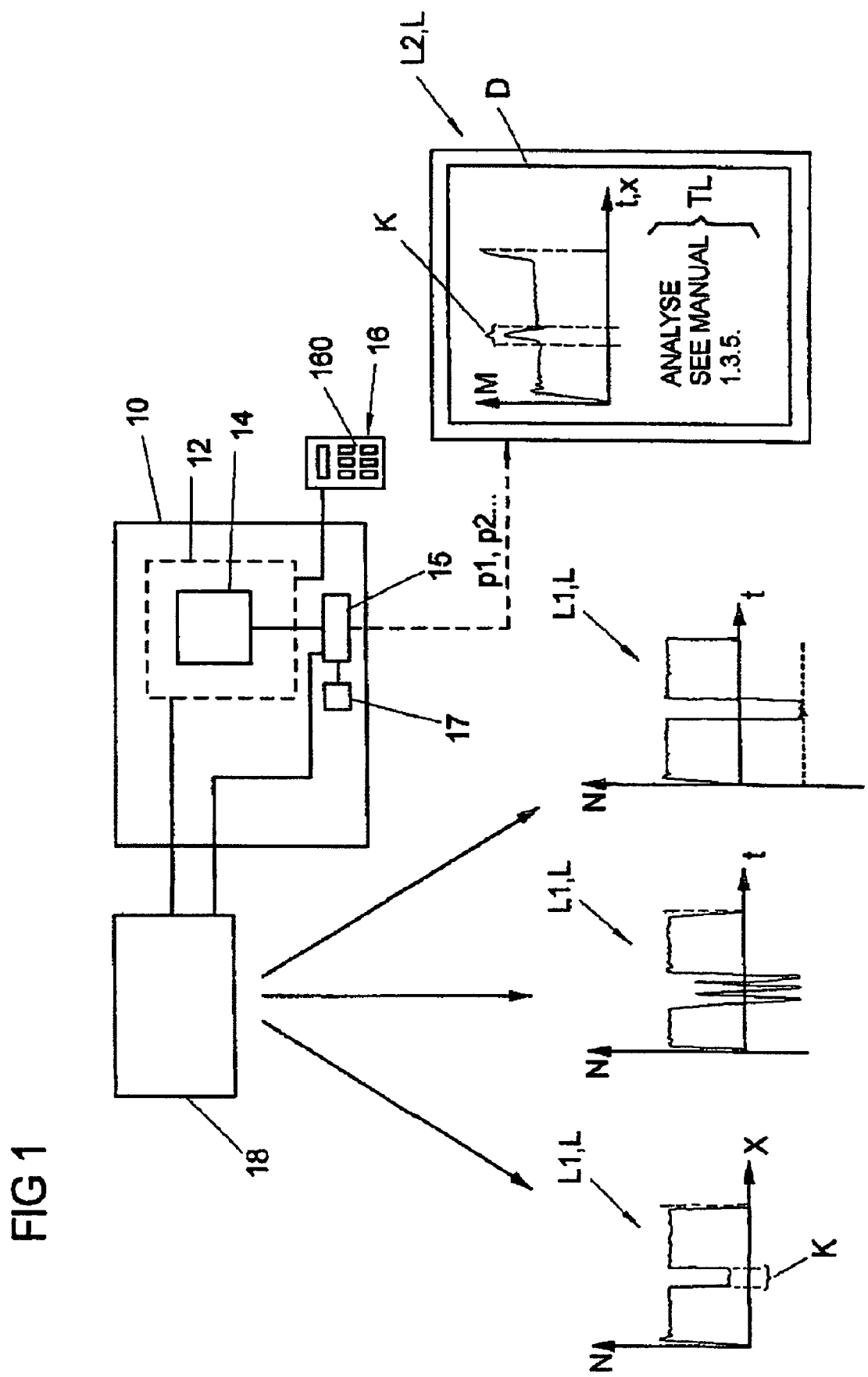
FIG. 1 is a schematic illustration of the control system and of its function in the form of block circuit diagram.

FIG. 1 shows the block diagram of a possible variant of the control system 10 for controlling an adjustment device (not illustrated in FIG. 1) in a motor vehicle, which adjustment device is operated by electric motor by means of a drive unit 18.

The control system 10 comprises an anti-trapping system 12. This anti-trapping system 12 is connected to the drive unit 18. The drive unit 18 drives the adjustment movement of an adjustment element 11 (not illustrated in FIG. 1) of the adjustment device 1 along an adjustment path X and usually comprises an electrically operated motor which interacts with the adjustment element 11 via a transmission unit.

FIGS. 2a to 2c show, as application examples, various adjustment devices 1 with the reflective adjustment 11 in the form of a window lifting system with a window pane 11 (FIG. 2a), as the motor vehicle seat adjustment means with a motor vehicle seat 11 (FIG. 2b) and as a motor-operated vehicle tailgate 11 (FIG. 2c). These application examples each have a control system 10 which interacts with the assigned drive unit 18. The drive unit 18 drives a movement of the respective adjustment element 11 along the adjustment path X.

For each of the adjustment devices 1 which is shown in FIGS. 2a to 2c, there is a vehicle element 13 which is arranged adjacent to the adjustment element 11. This vehicle element 13 is arranged in each case that the distance between the adjustment element 11 and the adjacent vehicle element 13 becomes smaller if the adjustment element 11 moves along the adjustment path X in the direction of the vehicle element 13. Since the distance between the adjustment element 11 and the vehicle element 13 becomes smaller, it is possible for an obstacle to be trapped between the adjustment element 11 and vehicle element 13 as a result of the adjustment movement. In order to be able to detect such a case of trapping, the control system 10 has an anti-trapping system. Such an anti-trapping system 12 is represented by way of example in the schematic illustration in FIG. 1.

The anti-trapping system 12 which is shown in FIG. 1 comprises an analysis unit 14 for analyzing mechanical running parameters (p1, p2 . . . ) which result from the adjustment movement of the adjustment devices. These running parameters (p1, p2 . . . ) can be selected in particular from the following parameters: rotational speed N of the drive unit 18 or of the driven adjustment element 11, torque M of the drive unit 18, the change over time in the rotational speed N or the torque M or else the length of movement of the adjustment element 11 or the play of the adjustment device 1 when the direction of movement of the adjustment element 11 reverses onto its adjustment path X. By means of characteristic changes in these mechanical running parameters (p1, p2 . . . ) or on the basis of limiting values being exceeded, it is possible to determine a case of trapping of an obstacle between the adjustment path 11 and the vehicle element 13.

The determination of a case of trapping causes the adjustment movement of the adjustment element 11 to be stopped and/or reversed. The case of trapping is therefore not determined directly by means of the mechanical interaction of a trapped obstacle with the adjustment element 11 and/or the vehicle element 13 but rather indirectly by means of the analysis of the mechanical running-in parameters (p1, p2 . . . ) mentioned above.

Furthermore, the control system 10 comprises a control unit 15 with an electronic memory element 17. Furthermore, an activation element 16 with a keypad 160 interacts with the control system 10. This activation element 16 can either be embodied separately, as illustrated in FIG. 1, or else as a component of the control system 10.

In the text which follows, the method of functioning of the control system 10 is described. By means of the activation element 16, the control system 10 can be placed in an analysis mode. This means that the analysis unit 14 of the anti-trapping system 12 does not analyze the mechanical running-in parameters (p1, p2 . . . ) of the adjustment device 1 with regard to a case of trapping but rather for mechanical functional faults. Different functional faults can be considered here depending on the specific embodiment of the adjustment device 1. If the adjustment device 1 provides guide rails for the movement of the adjustment element 11, these may be incorrectly positioned resulting in an undesired difficulty of movement at least in certain sections along the adjustment path X. If sealing elements are in frictional contact with moved elements of the adjustment device during the adjustment movement, incorrect position of the sealing elements may result in an increased frictional force to be overcome. If the sealing elements are absent, it is also conceivable that the sum of the forces which inhibit movement will be too low. Furthermore it is conceivable that there is damage to the transmission or that other elements project into the respective adjustment path X of the adjustment element 11 or interact mechanically with the adjustment element 11 in certain sections along the adjustment path X, therefore making the movement of the adjustment element 11 more difficult. If the adjustment device is embodied as a window lifter, these may be other components which are arranged in the interior of the door, for example the attachment for the exterior rear view mirror.

Such mechanical functional faults can be determined by means of the analysis unit 14 if, for example, the limiting values for changes in rotational speed which occur or changes in torque which occur are selected in a correspondingly sensitive way. If the analysis unit 14 has determined a mechanical functional fault of the adjustment device, the control device 15 generates a diagnostic message L. This diagnostic message L can be embodied, for example, as a characteristic movement sequence L of the adjustment element 11. For this purpose, the control device actuates the drive unit 18 in such a way that a detectable deviation from the customary movement sequence of the adjustment element 11 is ensured in what are referred to as critical areas K of the adjustment path X in which a mechanical functional fault is present. The person who is controlling the adjustment device 1 can request this diagnostic message by means of the activation element 16.

FIG. 1 illustrates three exemplary variants of a changed movement sequence L in the diagrams arranged on the left-hand side. The rotational speed N of the drive unit is illustrated for all three movement sequences L1 shown. In the case of the first movement sequence L1 which is illustrated on the left, the rotational speed N is plotted against the adjustment path X. In the case of this movement sequence L1, the rotational speed is significantly reduced in the illustrated critical area K which has a mechanical functional fault. In this way it is possible to satisfactorily detect mechanical functional faults of the adjustment device 1 along the adjustment path X given appropriate visual checking.

In the two further illustrated movement sequences L1, the rotational speed N is plotted in each case against the traveling time t. If the adjustment element 11 has reached, on its adjustment path X, the area of the mechanical functional fault of the adjustment device, the control unit 15 causes the adjustment element 11 to reverse a plurality of times (central diagram) or once (right-hand diagram) along the critical area by interacting with the drive unit 18. In this way, the critical area K of the adjustment path X can also be easily recognized by a person who is checking the method of functioning of the adjustment device 1. It is expedient if this person can repeatedly call the diagnostic messages L1 described above by means of the operator control element 16 until the mechanical functional fault of the adjustment device 1 is precisely identified and located.

Alternatively or cumulatively to the diagnostic message described above in the form of a characteristic movement sequence L1 of the adjustment element 11, a visual diagnostic message L2 can be implemented by means of the control unit 15 on the display D which is present in any case in the motor vehicle. The display D shows this as a diagrammatic representation of the mechanical running parameters p1, p2 . . . of the adjustment device 1 which represents, for example, the torque M plotted against the adjustment path X or the time t.

As a result, in contrast to the pure representation of the diagnostic message L by means of a changed movement sequence L1, a mechanical functional fault of the adjustment device 1 in a critical area K can be represented not only qualitatively but also quantitatively. The person performing a check can determine from the diagram to what extent the mechanical running parameters p1, p2 . . . shown differ from the customary values of a correctly mounted and functioning adjustment device 1.

Alternatively or cumulatively, the visual display message L2 which is represented on the display D can comprise a text component TL. This text component contains more extensive information on the elimination of the mechanical functional faults which are determined in the adjustment device 1. This can be implemented, for example, by equipping the analysis unit 14 of the control system 10 with a logic unit which is of correspondingly integrated electronic design and which permits customary mechanical functional faults to be categorized. This can go as far as storing the fault-free movement sequence of the adjustment element 11 at least in certain sections together with acceptable tolerance limiting values in a suitable memory element. As a result, the desired movement sequence of the adjustment element can be correspondingly checked.

In the variant of the window lifting system 1 shown in FIG. 2a with the control system 10, this is expedient, for example, for the running-area 110 of the window pane 11 which is arranged adjacent to the window seal 111. Since the running in of a seal of a motor vehicle window pane requires particular care with respect to the mounting or maintenance of a window lifting system 1, it is expedient to store running parameters of a process of running into the seal which is still acceptable in the worst case in the control system 10 so that the analysis unit 14 can perform a corresponding comparison.

It is also conceivable to embody the analysis device 14 with the functionality of a neural network in order to implement a self-adapting detection of mechanical malfunctions.

The categorization of the mechanical malfunction allows a selective indication of the more extensive information which is associated with the corresponding category of the fault, by means of the text component TL of the visual diagnostic message L2.

It is also conceivable for this more extensive information to be stored in a memory element of the adjustment device 1. As a result, when necessary it is possible to call the more extensive information via the display D without a separate manual having to be consulted.

The invention claimed is:

1. A control system for controlling an adjustment device which is operated by an electric motor in a motor vehicle, the control system comprising:
   an indirect anti-trapping system for detecting a trapping situation between an adjustment element, which is moved by the adjustment device in an adjustment movement along an adjustment path, and a vehicle element, wherein the anti-trapping system is configured to stop or reverse the adjustment movement of the adjustment element if a defined threshold value for a mechanical running parameter which results from the adjustment movement is exceeded,
   an analysis unit for analyzing the adjustment movement of the adjustment element, wherein the analysis unit functions, on the one hand, as a functional component of the anti-trapping system and, on the other hand to check for mechanical functional faults of the adjustment device other than a trapping situation in an analysis mode and to generate a diagnostic message indicating a mechanical functional fault of the adjustment device if a threshold value for a running parameter which is different than the threshold value for the detection of an anti-trapping situation is exceeded.

2. The control system of claim 1, wherein the functional faults are determinable in the form of above-average difficulty of movement of the adjustment device in certain sections along the adjustment path.

3. The control system of claim 1, wherein the control system has a control unit which generates at least one diagnostic message using the analyzed mechanical running parameters.

4. The control system claim 3, wherein the control unit is configured to generate the diagnostic message automatically or in response to a manual request.

5. The control system of claim 3, wherein the control unit implements the diagnostic message with at least one of a characteristic movement sequence of the adjustment element and as a visual diagnostic message in the form of a display of a message on a display which is arranged on the motor vehicle.

6. The control system of claim 5, wherein the visual diagnostic message comprises a diagram which represents the traveling movement.

7. The control system of claim 5, wherein the visual diagnostic message has a text component which contains instructions on how to find more extensive information on fault recovery.

8. The control system of claim 1, wherein the control system carries out rotational speed monitoring of the adjustment device with the analysis unit forming mean values over the entire adjustment path.

9. The control system of claim 1, wherein the control system monitors fluctuations in synchronism of the adjustment device with the analysis unit.

10. The control system of claim 1, wherein the control system can be placed in the analysis mode with an activation element on the motor vehicle.

11. The control system of claim 10, wherein, in order to activate the analysis mode, the control system additionally requests inputting of a code with the activation element.

12. The control system of claim 1, wherein, in the analysis mode of the control system, the analysis unit has lower threshold values for at least one of a maximum torque and a maximum change in torque of the adjustment device over a time interval or over a distance interval of the adjustment path.

13. The control system of claim 12, wherein for critical position areas along the adjustment path at which the lower threshold values are exceeded, the control system is configured to generate a diagnostic message configured as a characteristic movement sequence of the adjustment element along the critical position areas.

14. The control system of claim 13, wherein the diagnostic message is additionally configured as a visual diagnostic message for critical position areas, and said diagnostic message is configured to be displayed with a display which is arranged on the motor vehicle.

15. The control system of claim 14, wherein the visual display message is configured in the form of a diagram which represents the travel path.

16. The control system of claim 14, wherein the visual diagnostic message has a text component which contains instructions on how to find more extensive information on fault recovery.

17. The control system of claim 1, wherein the control system has an electronic memory element for storing the mechanical running parameters which are determined.

18. A window lifting system for a motor vehicle window pane, having a control system for controlling an adjustment device which is operated by an electric motor in a motor vehicle, the control system comprising:
   an indirect anti-trapping system for detecting a trapping situation between an adjustment element, which is moved by the adjustment device in an adjustment movement along an adjustment path, and a vehicle element, wherein the anti-trapping system is configured to stop or reverse the adjustment movement of the adjustment element if a defined threshold value for a mechanical running parameter which results from the adjustment movement is exceeded;

an analysis unit for analyzing the adjustment movement of the adjustment element, wherein the analysis unit functions, on the one hand, as a functional component of the anti-trapping system, and on the other hand, to check for mechanical functional faults of the adjustment device other than a trapping situation in an analysis mode, and to generate a diagnostic message indicating a mechanical functional fault of the adjustment device if a threshold value for a running parameter which is different than the threshold value for the detection of an anti-trapping situation is exceeded.

19. The window lifting system of claim 18, wherein the control system compares the mechanical running parameters determined for a running-in area of the window pane into an assigned window seal with parameter limiting-values for satisfactory running in of the window pane into the seal.

20. Vehicle seat system for a motor vehicle seat having a control system for controlling an adjustment device which is operated by an electric motor in a motor vehicle, the control system comprising:

an indirect anti-trapping system for detecting a trapping situation between an adjustment element, which is moved by the adjustment device in an adjustment movement along an adjustment path, and a vehicle element, wherein the anti-trapping system is configured to stop or reverse the adjustment movement of the adjustment element if a defined threshold value for a mechanical running parameter which results from the adjustment movement is exceeded;

an analysis unit for analyzing the adjustment movement of the adjustment element, wherein the analysis unit functions, on the one hand, as a functional component of the anti-trapping system and, on the other hand to check for mechanical functional faults of the adjustment device other than a trapping situation in an analysis mode and to generate a diagnostic message indicating a mechanical functional fault of the adjustment device if a threshold value for a running parameter which is different than the threshold value for the detection of an anti-trapping situation is exceeded.

21. An adjustment system for a tailgate of a motor vehicle having a control system for controlling an adjustment device which is operated by an electric motor in a motor vehicle, the control system comprising:

an indirect anti-trapping system for detecting a trapping situation between an adjustment element, which is moved by the adjustment device in an adjustment movement along an adjustment path, and a vehicle element, wherein the anti-trapping system is configured to stop or reverse the adjustment movement of the adjustment element if a defined threshold value for a mechanical running parameter which results from the adjustment movement is exceeded;

an analysis unit for analyzing the adjustment movement of the adjustment element, wherein the analysis unit functions, on the one hand, as a functional component of the anti-trapping system and, on the other hand to check for mechanical functional faults of the adjustment device other than a trapping situation in an analysis mode and to generate a diagnostic message indicating a mechanical functional fault of the adjustment device if a threshold value for a running parameter which is different than the threshold value for the detection of an anti-trapping situation is exceeded.

* * * * *